United States Patent
Bartfai et al.

(10) Patent No.: US 7,647,357 B2
(45) Date of Patent: Jan. 12, 2010

(54) DATA TRANSFER MANAGEMENT IN CONSISTENCY GROUP FORMATION

(75) Inventors: Robert Francis Bartfai, Tucson, AZ (US); Pierre-Fortin Jean-Denis, Tucson, AZ (US); Gail Andrea Spear, Tucson, AZ (US); Sonny Earl Williams, Tucson, AZ (US); Sherry Suzanne Worcester, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 10/987,570

(22) Filed: Nov. 12, 2004

(65) Prior Publication Data

US 2006/0106747 A1 May 18, 2006

(51) Int. Cl.
G06F 17/30 (2006.01)
G06F 15/16 (2006.01)

(52) U.S. Cl. .............. 707/200; 709/201; 709/224; 709/226; 711/162; 707/10

(58) Field of Classification Search .............. None
See application file for complete search history.

(56) References Cited

U.S. PATENT DOCUMENTS

| | | | | |
|---|---|---|---|---|
| 5,504,861 A | * | 4/1996 | Crockett et al. | 714/13 |
| 5,615,329 A | * | 3/1997 | Kern et al. | 714/6 |
| 5,905,730 A | * | 5/1999 | Yang et al. | 370/235 |
| 7,047,377 B2 | * | 5/2006 | Elder et al. | 711/162 |
| 2002/0019871 A1 | * | 2/2002 | Asamoto et al. | 709/224 |
| 2002/0091749 A1 | * | 7/2002 | Katayama | 709/201 |
| 2003/0061362 A1 | * | 3/2003 | Qiu et al. | 709/229 |
| 2004/0153567 A1 | * | 8/2004 | Lichtenstein | 709/235 |
| 2005/0071588 A1 | * | 3/2005 | Spear et al. | 711/162 |
| 2005/0188089 A1 | * | 8/2005 | Lichtenstein et al. | 709/226 |
| 2006/0143454 A1 | * | 6/2006 | Walmsley | 713/170 |

* cited by examiner

*Primary Examiner*—Cam Y Truong
*Assistant Examiner*—Dung K Chau
(74) *Attorney, Agent, or Firm*—William K. Konrad; Konrad Raynes & Victor LLP

(57) ABSTRACT

Provided are a method, system, deployment and program for managing data transfer in consistency group formation. In one embodiment, a transfer time for a data structure is selected as a function of at least one determined backlog. Upon expiration of the selected transfer time, the mode of operation may be switched. By dynamically selecting a transfer time, backlogs may be reduced to increase the likelihood of successful creation of a consistency group. Other embodiments are described and claimed.

21 Claims, 6 Drawing Sheets

Relationship Record

DATA TRANSFER MANAGEMENT IN CONSISTENCY GROUP FORMATION

BACKGROUND

Disaster recovery systems typically address two types of failures, a sudden catastrophic failure at a single point in time or data loss over a period of time. To assist in recovery of data updates, a copy of data may be provided at a remote location. Such dual or shadow copies are typically made as the application system is writing new data to a primary storage device. International Business Machines Corporation (IBM), the assignee of the subject patent application, provides the following systems for maintaining remote copies of data at a secondary site, Extended Remote Copy (XRC) and Peer-to-Peer Remote Copy (PPRC). These systems provide a method for the continuous mirroring of data to a remote site to failover to during a failure at the primary site from which the data is being continuously mirrored. Such data mirroring systems can also provide an additional remote copy for non-recovery purposes, such as local access at a remote site. The IBM XRC and PPRC systems are described in the IBM publication "DFSMS/MVS Version 1 Remote Copy Administrator's Guide and Reference; Document Number SC35-0169-03 © Copyright IBM Corp. 1994, 1997), which publication is incorporated herein by reference in its entirety.

In such backup systems, data is maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD. In the IBM XRC environment, the application system writing data to the primary volumes includes a sysplex timer which provides a time-of-day (TOD) value as a time stamp to data writes. The host system time stamps data sets when writing such data sets to volumes in the primary DASD. The integrity of data updates is related to insuring that updates are done at the secondary volumes in the volume pair in the same order as they were done on the primary volume. In XRC and other prior art systems, the cross systems common time stamp provided by the system on behalf of the application program determines and maintains the logical sequence of data updates across any number of data volumes on any number of storage systems. In many application programs, such as database systems, certain writes cannot occur unless a previous write occurred; otherwise the data integrity would be jeopardized. Such a data write whose integrity is dependent on the occurrence of a previous data writes is known as a dependent write. For instance, if a customer opens an account, deposits $400, and then withdraws $300, the withdrawal update to the system is dependent on the occurrence of the other writes, the opening of the account and the deposit. When such dependent transactions are copied from the primary volumes to secondary volumes, the transaction order must be maintained to maintain the integrity of the dependent write operation.

Volumes in the primary and secondary DASDs are consistent when all writes have been transferred in their logical order, i.e., all dependent writes transferred first before the writes dependent thereon. In the banking example, this means that the deposit is written to the secondary volume before the withdrawal. A consistency group is a collection of updates to the primary volumes such that dependent writes are secured in a consistent manner. For instance, in the banking example, this means that the withdrawal transaction is in the same consistency group as the deposit or in a later group; the withdrawal cannot be in an earlier consistency group. Consistency groups maintain data consistency across volumes and storage devices. For instance, if a failure occurs, the deposit will be written to the secondary volume before the withdrawal. Thus, when data is recovered from the secondary volumes, the recovered data will be consistent.

A consistency time is a time the system derives from the application system's time stamp to the data set. A consistency group has a consistency time for all data writes in a consistency group having a time stamp equal or earlier than the consistency time stamp. In the IBM XRC environment, the consistency time is the latest time to which the system guarantees that updates to the secondary volumes are consistent. As long as the application program is writing data to the primary volume, the consistency time increases. However, if update activity ceases, then the consistency time does not change as there are no data sets with time stamps to provide a time reference for further consistency groups. If all the records in the consistency group are written to secondary volumes, then the reported consistency time reflects the latest time stamp of all records in the consistency group. Methods for maintaining the sequential consistency of data writes and forming consistency groups to maintain sequential consistency in the transfer of data between a primary DASD and secondary DASD are described in U.S. Pat. Nos. 5,615,329 and 5,504,861, which are assigned to IBM, the assignee of the subject patent application, and which are incorporated herein by reference in their entirety.

One technique to maintain consistency across copies is to timestamp data across primary volumes using a common clock source, referred to as a SYSPLEX timer. Details of creating and operating data structures in the formation of consistency groups are described in the copending and commonly assigned patent application entitled "METHOD, SYSTEM, AND PROGRAM FOR FORMING A CONSISTENCY GROUP", having Ser. No. 10/676,852, filed Sep. 29, 2003, which patent application is incorporated herein by reference in its entirety. One data structure, an out of synch bitmap, may be used to indicate tracks to be transferred. A storage controller may receive a consistency group formation command to copy specified volumes managed by the storage controller to a remote site. In response, the storage controller may queue any further writes while generating a change recording bitmap to keep track of queued writes as well as any subsequent writes after formation of the consistency group is initiated. This mode of operation may be referred to as a "Consistency Group in Progress Mode." In this mode, tracks indicated in the out-of-synch bitmap may be copied to the remote site to create a consistency group.

After the out of synch bitmap is drained such that all the asynchronous remote copy operations indicated in the out of synch bitmap have been completed, a consistency group may have been formed. If so, the mode of operation may switch to a second mode in which subsequent writes may instead be recorded in the out of synch bitmap. Tracks indicated in the out-of-synch bitmap may continue to be copied to the remote site. This mode of operation may be referred to as a "Normal Transfer Mode," for example. In this mode, the change recording bitmap may be merged with the out of synch bitmap, and the change recording bitmap may be discarded. Further, a virtual copy may be performed at the remote site of the volumes consistent as of the time of the storage controller receiving the point-in-time copy command.

In general, all of the bits in the out of synch bitmap are cleared in the Consistency Group in Progress mode before a consistency group is successfully formed. One approach to managing the data transfer in consistency group formation is to impose a fixed time limit on the creation of the consistency group. If the out of synch bitmap is not completely drained before the expiration of the fixed period of time, then the consistency group formation attempt is deemed failed. If so, the mode of operation may be switched from the Consistency Group in Progress Mode to the Normal Transfer Mode. In preparation for the mode switch, the bits of the change recording bitmap may be merged with the out of synch bitmap and any new host writes are recorded in the out of synch bitmap by setting appropriate bits of the out of synch bitmap. As a consequence, tracks from all volumes may be transferred to remote sites as the out of synch bitmap continues to be drained. Thus, a backlog of writes for the next consistency group formation attempt can be reduced or eliminated in some applications.

If the out of synch bitmap is not completely drained after another fixed time period, another attempt may be made to form a consistency group by switching back to the Consistency Group in Progress Mode. Accordingly, the storage controller may queue any subsequent writes while generating the change recording bitmap. After generating the change recording bitmap, any queued writes and subsequent writes may be indicated in the change recording bitmap, and tracks indicated in the out-of-synch bitmap may continue to be copied to the remote site. Again, if the out of synch bitmap is not fully drained by the expiration of the fixed time period, the consistency group formation may be deemed a failure and the mode of operation may be switched back to the Normal Transfer Mode. After a certain number consistency group attempts are failed (such as five consistency group attempts, for example) due to the draining of the out of synch bitmap exceeding the fixed time limit for formation of each consistency group, the fixed time limit may be ignored. As a consequence, the operation mode may remain in the Consistency Group in Progress mode until a consistency group is successfully formed.

SUMMARY OF ILLUSTRATED EMBODIMENTS

Provided are a method, system, and program for managing data transfer in forming a consistency group of data. In one embodiment, segments of data identified in a first data structure, are transferred from a source of a plurality of sources to a destination of a plurality of destinations. The first data structure is updated to indicate a transfer of a segment of data and, in a first mode, the first data structure is updated to indicate additional segments of data to be transferred between the sources and destinations of the consistency group. In accordance with one aspect of the present description, upon expiration of a dynamically selected transfer time, the mode of operation may be switched to a second mode in which consistency groups may be formed. In this second mode, a second data structure instead of the first data structure is updated to indicate additional segments of data to be transferred between the sources and destinations of the consistency group. In one embodiment, in selecting a transfer time, at least one backlog of data segments to be transferred from at least one source to at least one destination of the consistency group is determined. A transfer time for the first data structure is selected as a function of the at least one determined backlog.

Upon expiration of a second time period prior to creation of the consistency group, the second data structure is merged into the first data structure. In resuming the first mode, the first data structure is updated instead of the second data structure to indicate additional segments of data to be transferred between sources and destinations of the consistency group.

In another aspect, the sources of the consistency group being created are maintained by a plurality of servers and a transfer rate is determined for each server. Also, an estimated transfer time is determined for each server and the transfer time of greatest duration is selected.

In still another aspect, a determination of a transfer rate includes determining at a first time, the number of tracks remaining to be transferred for a particular server toward creation of the consistency group as indicated by the first data structure, determining at a second, subsequent time, the number of tracks remaining to be transferred for the particular server toward creation of the consistency group as indicated by the first data structure, determining the rate of change of the number of tracks remaining to be transferred for the particular server as a function of the change in the number of tracks determined at the first and second times and dividing by the duration of time between the first and second times.

In yet another aspect, determining an estimated transfer time for each server includes dividing the number of tracks remaining to be transferred for the particular server toward creation of the consistency group as indicated by the first data structure, by the data transfer rate determined for the particular server. In addition, the determined transfer time may be multiplied by a constant. Other embodiments are described and claimed.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural operational changes may be made without departing from the scope of the present description.

Figure 1:
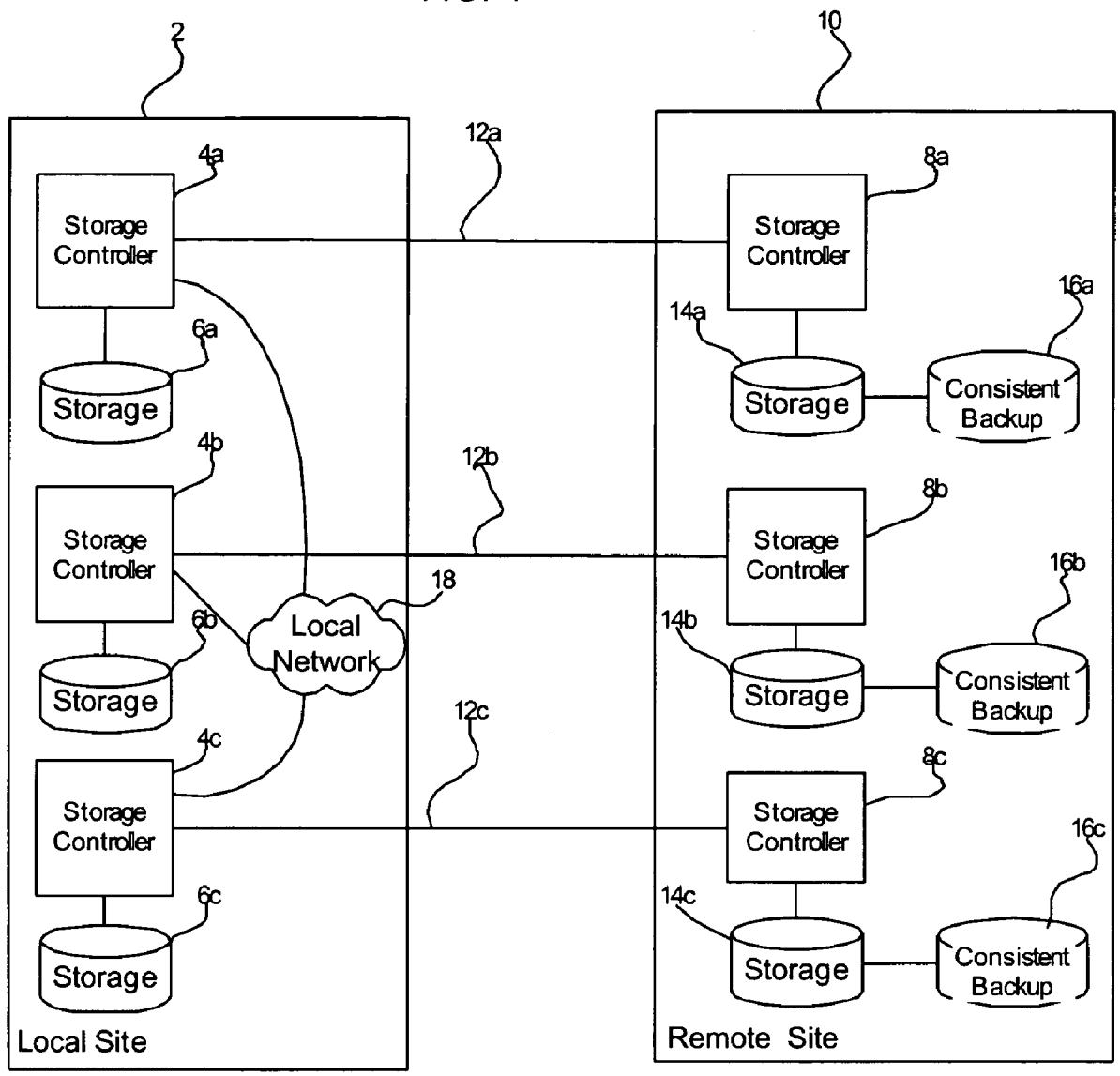
FIG. 1 is a block diagram illustrating a network computing environment in which aspects of the description provided herein may be employed.

FIG. 1 illustrates a network computing environment in which aspects of the described embodiments may be employed. A local site 2 includes storage controllers 4a, 4b, 4c, where each storage controller 4a, 4b, 4c is coupled to an attached storage system 6a, 6b, 6c, respectively. The storage controllers 4a, 4b, and 4c manage Input/Output (I/O) access to volumes in the storage systems 6a, 6b, 6c from host systems (not shown). Each storage controller 4a, 4b, 4c copies data to a corresponding remote storage controller 8a, 8b, 8c at a remote site 10 via connections 12a, 12b, and 12c. The storage controllers 4a, 4b, and 4c transmit data consistent as of point-in-times to the remote storage controllers 8a, 8b, 8c, where the remote storage controllers 8a, 8b, 8c store the data to their respective attached remote storage systems 14a, 14b, 14c. In certain embodiments, the storage controllers 4a, 4b, 4c continuously transmit data to the remote site 10, and at certain instances in time will ensure consistency of the data at the remote site 10. In certain embodiments, the remote site 10 may save a consistency group of data to another storage, such as consistent backup storages 16a, 16b, 16c, to maintain a backup of the consistent data at the remote site 10. After a consistent group of data is transmitted to the remote storage 14a, 14b, 14c, a copy is made from remote storage 14a, 14b, 14c to a respective consistent backup storage 16a, 16b, 16c. Although FIG. 1 illustrates a certain number of components at the sites, such as three storage controllers and storages, the described embodiments may operate with any number of storage controllers and storage systems at the sites.

As explained in greater detail below, in managing data transfers in a consistency group formation, a time duration for limiting operation in a particular mode may be dynamically adapted. For example, based upon transfer rates for the sources and the number of tracks or other data segments to be transferred for each particular source, a maximum drain or transfer time for that mode may be selected. As used herein, a data structure indicating data segments to be transferred is drained as the indicated data segments are successfully transferred and the data structure is updated accordingly. Once the data structure is fully drained, the data structure will indicate no further transfers to be completed. If the selected transfer time expires prior to draining the data structure, the mode of operation may be switched. The transfer time may be selected in a manner which can significantly improve backlog reduction and thereby increase the chances of a successful consistency group formation.

A data segment may be a single track, multiple tracks, a portion of a track or any other unit of data suitable for transfer. The remote site 10 may be hundreds or thousands of miles from the local site 2. The connections 12a, 12b, 12c between pairs of storage controllers may comprise a dedicated line, such as a dedicated fiber optical network or connection maintained by a long distance telecommunication carrier, long distance fiber optic connection having channel extenders, or extend through a network, such as a Storage Area Network (SAN), Local Area Network (LAN), the Internet, and Intranet, etc.

Host systems (not shown) at the local site 2 may perform Input/Output (I/O) operations with respect to volumes in the storage systems 6a, 6b, and 6c. The host systems may communicate with storage controllers 4a, 4b, 6c via any network or connection known in the art. The storage controllers 4a, 4b, 4c at the local site may have certain master-subordinate relationships with respect to the volumes managed by the storage controllers. For instance, one storage controller may be designated as a master, e.g., 4c, and others designated as subordinates, e.g., 4a, 4b. Volumes controlled by controllers designated as subordinates may be managed by the storage controller designated as the master. In this way, one master storage controller may manage remote copy operations for specified volumes for subordinate controllers designated as subordinates for a particular master.

The storage controllers 4a, 4b, 4c, 8a, 8b, 8c further include a processor complex and may comprise any storage controller or server known in the art, such as the IBM Enterprise Storage Server (ESS)®, 3990 Storage Controller, etc. (Enterprise Storage Server is a registered trademark of IBM). The storage systems 6a, 6b, 6c, 14a, 14b, 14c, 16a, 16c, and 16c may comprise an array of storage devices, such as Just a Bunch of Disks (JBOD), Redundant Array of Independent Disks (RAID) array, tape drive, virtualization device, etc.

Figure 2:
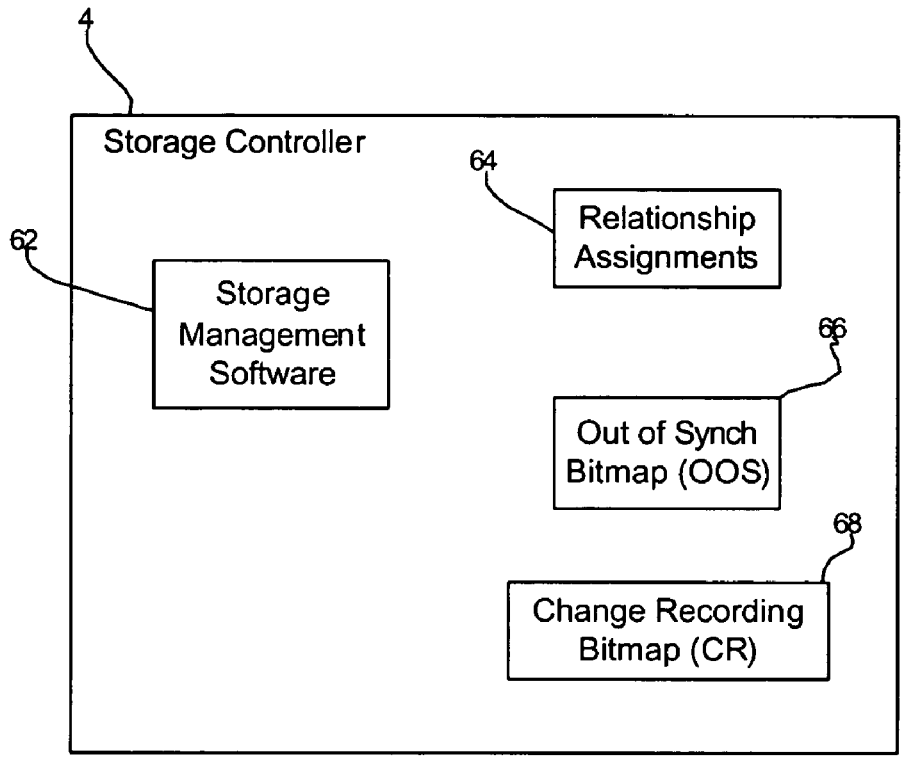
FIG. 2 illustrates an arrangement of a storage controller in accordance with one embodiment.

FIG. 2 illustrates programs and information that may be included in a storage controller 4 at the local site 2, e.g., storage controllers 4a, 4b, 4c, including storage management software 62, relationship assignment information 64, an out-of-synch bitmap (OOS) 66, and a change recording (CR) bitmap 68. The storage management software 62 may include code to allow for remote copying of data, such as the code included in the IBM PPRC Extended Distance program, to allow for mirroring of data over relatively short and long distances. Further details of the IBM PPRC extended distance program are described in the IBM publication "IBM Total-Storage Enterprise Storage Server PPRC Extended Distance", having document no. SG24-6568-00 (Copyright IBM, June 2002), which publication is incorporated herein by reference in its entirety. The relationship information 64 maintained by the storage management software 62 includes information for each volume (or portion of a volume) on the storage 6a, 6b, 6c, respectively, subject to a consistency group relationship. For master-subordinate environments, such as shown in FIG. 1, the relationship information 64 further indicates whether the storage controller is a master for a consistency group relationship or whether a volume in the attached storage is a subordinate in a consistency group relationship. A storage controller designated as the master storage controller, e.g., 4c, manages consistency group copy operations for designated volumes in its attached storage, e.g., 6c, or volumes in other storage systems, e.g., 6a, 6b, managed by other storage controllers, e.g., 4a, 4b, designated as subordinates. Thus, the master-subordinate designation may be made on a volume-by-volume basis. In alternative embodiments, the master-subordinate designation may be made at a sub-volume level. Different volumes in one storage controller may be assigned as subordinates to different point-in-time copy relationships. Thus, a master storage controller may control the point-in-time copy for volumes distributed in the storage systems managed by different storage controllers.

The local storage controllers 4a, 4b, 4c may communicate over a local network 18, which may comprise direct connections or a switched network. Alternatively, the storage controllers 4a, 4b, 4c may communicate over a link 12a, b, c if the links also extend through a network at the local site 2.

In further embodiments, the mirroring of data and consistency group management may occur on a session basis. A session may be defined as including multiple volumes that may be referenced using a session name when the session is started. A master-subordinate relationship may be assigned to a session so that relationship would apply to all volumes in the session. All volumes defined within a session would be included in the same consistency group.

Figure 3:
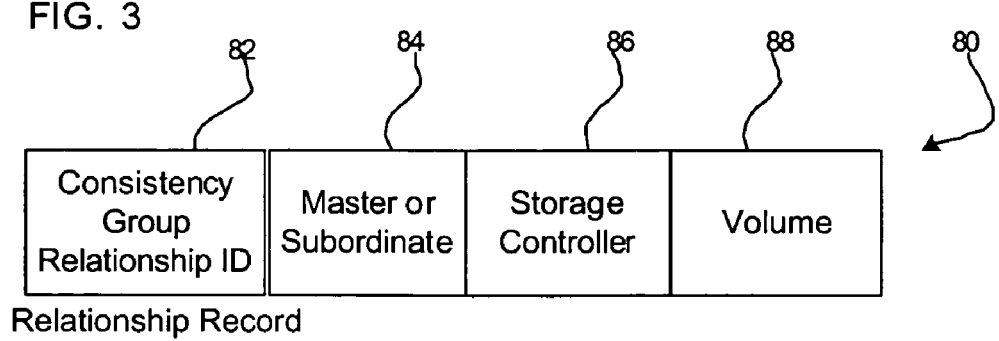
FIG. 3 illustrates relationship information in accordance with one embodiment.

The relationship information 64 may include a plurality of relationship assignments, one for each volume for which the storage controller is designated as a master or subordinate. FIG. 3 illustrates information included in a relationship assignment 80.

A relationship identification field 82 indicates an ID of a consistency group copy relationship because there may be many relationships, each assigned a group of volumes, across the storage controllers 4a, 4b, 4c. Thus, a storage controller 4a, 4b, 4c may be a master for multiple consistency group relationships, or have volumes that are subordinates in different relationships. The master-subordinate field 84 indicates whether the assignment is for a master or subordinate relationship. If the master-subordinate indicator 84 specifies "master", then that storage controller, e.g., 4c, including that assignment 80, is a master in the master-subordinate relationship identified in field 82 for the volume indicated in the volume information 88 managed by the storage controller, e.g., 4a or 4b, indicated in the storage controller information 86. Likewise, if the master-subordinate indicator 82 specifies "subordinate", then the volume in the attached storage, e.g., 6a or 6b, indicated in the volume information 88, is a subordinate in the relationship identified in field 82 to the master storage controller, e.g., 4c, indicated in the storage controller information 86. A master storage controller, e.g., 4c, may be assigned a subordinate volume that is in storage, e.g., 6a, 6b, attached to another storage controller, e.g., 4a, 4b, or is in the storage, e.g., 6c, attached to the master storage controller, e.g., 4c. Thus, a master may be assigned subordinate volumes in the attached storage and/or in storage systems attached to other storage controllers. Further, a storage controller may be assigned as a master for volumes in the attached storage and/or storages managed by other storage controllers and, at the same time, include volumes that are assigned as subordinates to a master, where that master may be the storage controller itself or another storage controller.

Further, the assignment information 64 for a master storage controller would include a relationship record 80 for each subordinate volume on a subordinate storage controller, where the subordinate storage controller and volume would be indicated in fields 86 and 88, respectively. The relationship information may be maintained in a different arrangement and format than shown in FIG. 3, and may be maintained in any data structure known in the art, such as a text or formatted text file, database, etc.

An out-of-synch bitmap 66 includes a bit for each track that the subordinate storage controllers are to copy over to the corresponding remote storage. During normal copy operations, any writes to a storage controller are recorded in the out-of-synch bitmap (OOS) 66 and then copied over to the remote storage. The change recording bitmap 68 includes a bit for each track to which an update is received during the formation of a consistent set of data. Further, the storage controllers 4a, 4b, 4c may maintain one set of these bitmaps for each volume, or alternatively maintain one set of bitmaps 66 and 68 for a group of volumes in the attached storage 6a, 6b, 6c.

Figure 4:
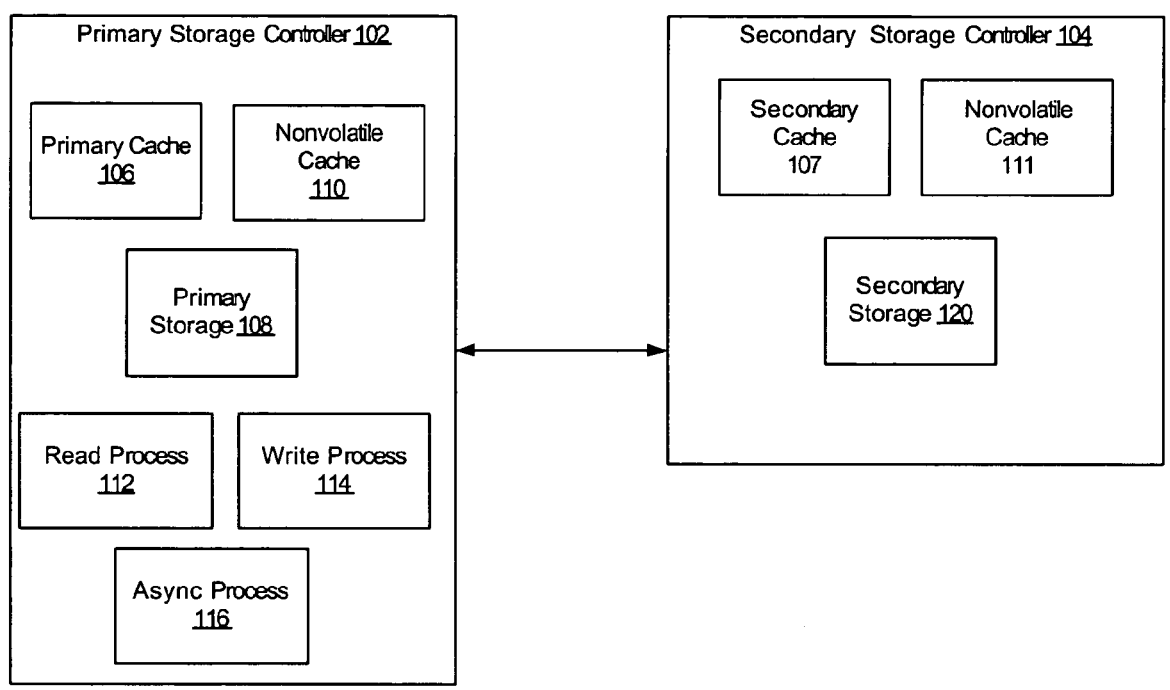
FIG. 4 illustrates components within the storage controllers of FIG. 1 in accordance with one embodiment.

In certain embodiments, the storage controllers run a background process to copy any tracks indicated as updated in their out-of-synch bitmaps to the remote storage. This process continues in the subordinate controllers even after the formation of a consistency group is initiated and the change recording bitmap created. FIG. 4 illustrates further details of the storage controllers 4a, 4b, 4c, where each is referred to a primary storage controller 102 that copies data to a secondary storage controller 104, such as storage controllers 14a, 14b, 14c, which receive the data. The primary storage controller 102 includes a primary cache 106 in which updates to tracks in the attached storage 108 managed by the primary storage controller 102, such as storages 6a, 6b, 6c, are maintained until written to the attached primary storage 108 (i.e., the tracks are destaged). Additionally, the primary storage controller 102 includes a nonvolatile cache 110. The non-volatile cache 110 may be, for example, a battery-backed up volatile memory, to maintain a non-volatile copy of data updates and other information. The secondary storage controller 104 similarly may include a secondary cache 107 and a nonvolatile cache 111.

The primary storage controller 102 includes a read process 112 for reading data, and a write process 114 for writing data. The primary storage controller 102 also includes an async process 116 for transferring data from the primary storage controller 102 to remote storage, such as storage at the secondary storage controller 104. In certain embodiments, the async process 116 may perform synchronization of data for an asynchronous PPRC Extended Distance service. In such cases, the async process 116 runs continuously for the PPRC Extended Distance service. In certain embodiments, there may be multiple async processes (e.g., one async process for each volume on primary storage 108 for PPRC Extended Distance). In certain embodiments, the read process 112, write process 114, and async process 116 are embodied in firmware. The secondary storage controller 104 writes the data received from the primary storage controller 102 to secondary storage 120, such as storages 14a, 14b, 14c (FIG. 1). The different processes 112, 114, and 116 may be embodied in storage management software 62.

Additional details of creating and operating OOS and CR data are described in the copending and commonly assigned patent application entitled "METHOD, SYSTEM, AND PROGRAM FOR FORMING A CONSISTENCY GROUP", having Ser. No. 10/676,852, filed Sep. 29, 2003, which patent application is incorporated herein by reference in its entirety.

In one example of the formation of a consistency group, a primary storage controller 102 may receive a consistency group formation command to copy specified volumes managed by the primary storage controller 102 to a remote site. In response, the primary storage controller 102 may queue any further writes while generating the change recording bitmap 68. After generating the change recording bitmap 68, any queued writes and subsequent writes may be indicated in the change recording bitmap 68, and tracks indicated in the out-of-synch bitmap 66 may be copied to the remote site. This mode of operation may be referred to as a "Consistency Group in Progress Mode."

After the OOS 66 is drained such that all the asynchronous remote copy operations indicated in the OOS 66 have been completed, subsequent writes may instead be recorded in the OOS 66 and tracks indicated in the out-of-synch bitmap 66 may continue to be copied to the remote site. This mode of operation may be referred to as a "Normal Transfer Mode," for example. In this mode, the change recording bitmap 68 may be merged with the OOS 66, and the change recording bitmap 68 may be discarded. Further, a virtual copy may be performed at the remote site of the volumes consistent as of the time of the primary storage controller 102 receiving the point-in-time copy command.

In general, all of the bits in the OOS 66 are cleared before a consistency group is successfully formed. It is appreciated that a temporary load imbalance may create a situation in which a relative few volumes in the consistency group have many bits set in the OOS 66, indicating many tracks to be transferred from those source volumes. Conversely, a number of source volumes may have relatively few bits set in the OOS 66, indicating few tracks to be transferred from those source volumes. As a consequence, the bits for many volumes may be cleared from the OOS 66 for a relatively long period of time before all the bits for a few source volumes which are heavily loaded with tracks are transferred within the consistency group. If new tracks to be transferred are being indicated in the change recording bitmap 68 instead of the OOS 66, a large number of volumes can be prevented from transferring any tracks while awaiting the completion of the transfer of tracks for the more heavily loaded volumes. Thus, host writes being collected in the change recording bitmap 68 can create a large backlog of writes to be transferred during creation of the next consistency group. As a consequence, the number of tracks to be transferred during the formation of the next consistency group may be substantially increased.

One approach to managing the data transfer in consistency group formation is to impose a fixed time limit on the creation of the consistency group. If the OOS 66 is not completely drained before the expiration of the fixed period of time, then the consistency group formation attempt is deemed failed. If so, the mode of operation may be switched from the Consistency Group in Progress Mode to the Normal Transfer Mode. Accordingly, the bits of the change recording bitmap 68 may be merged with the OOS 66 and any new host writes are recorded in the OOS 66 by setting appropriate bits of the OOS 66. As a consequence, tracks from all volumes may be transferred to remote sites as the OOS 66 continues to be drained. Thus, a large backlog of writes for the next consistency group formation attempt can be reduced or eliminated in some applications.

If the OOS 66 is not completely drained after another fixed time period, another attempt may be made to form a consistency group by switching back to the Consistency Group in Progress Mode. Accordingly, the primary storage controller 102 may queue any subsequent writes while generating the change recording bitmap 68. After generating the change recording bitmap 68, any queued writes and subsequent writes may be indicated in the change recording bitmap 68, and tracks indicated in the out-of-synch bitmap 66 may continue to be copied to the remote site. Again, if the OOS 66 is not fully drained by the expiration of the fixed time period, the consistency group formation may be deemed a failure and the mode of operation may be switched back to the Normal Transfer Mode. After a certain number consistency group attempts are failed (such as five consistency group attempts, for example) due to the draining of the OOS 66 exceeding the fixed time limit for formation of each consistency group, the fixed time limit may be ignored. As a consequence, the operation mode may remain in the Consistency Group in Progress mode until a consistency group is successfully formed.

Figure 5:
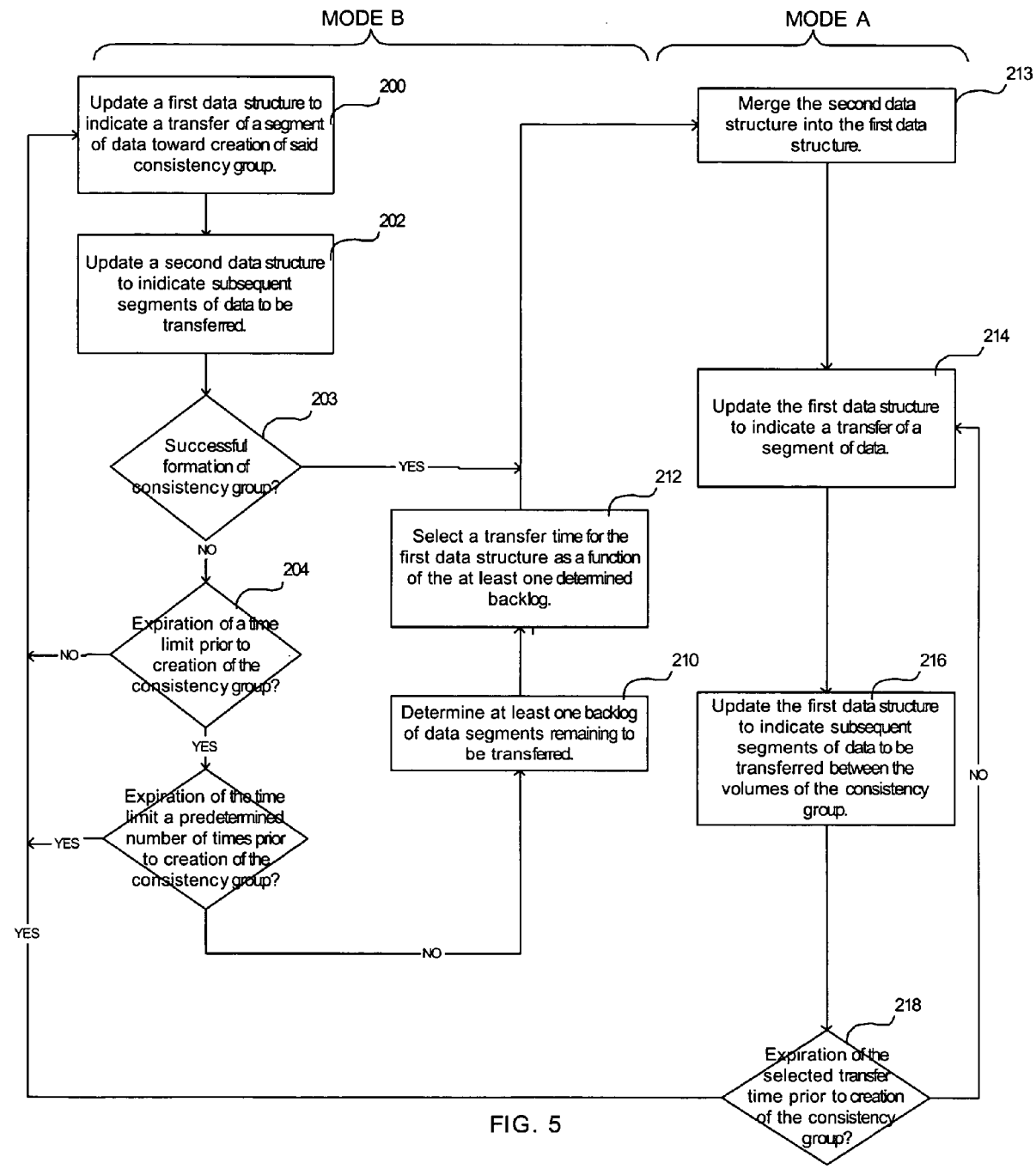
FIG. 5 illustrates operations performed by storage controllers to manage data transfers toward creation of consistency groups in accordance with one embodiment.

FIG. 5 illustrates another approach to operations performed by a primary storage controller 102, e.g., 4c, to manage data transfer in a consistency group formation. In this example, a time duration for limiting operation in a particular mode, such as the Normal Transfer mode, for example, may be dynamically adapted. For example, as the OOS 66 drains, a data transfer rate from at least one source to at least one destination in the consistency group may be determined. Based upon the transfer rates for the sources and the number of tracks or other data segments to be transferred for each particular source, a potential transfer time for the data may be selected. When the selected transfer time has expired then the mode of operation may be switched to another mode such as the Consistency Group in Progress mode, for example. Thus, for example, if the primary storage controller 102 is in a Normal Transfer Mode, the duration of that mode may be tailored to permit backlogs to be substantially eliminated or reduced. When the selected transfer time expires, the mode of operation may be switched to the Consistency Group In Progress mode with a reduced backlog to increase the chances of a successful consistency group formation. In addition, long waits in the Consistency Group in Progress mode with little chance of successfully forming a consistency group because of a large backlog may be substantially reduced as well.

In the example of FIG. 5, two modes of operation are depicted. In a first mode, designated mode A, the operations may be similar to a Normal Transfer Mode, for example. In a second mode, designated mode B, the operations may be similar to a Consistency Group In Progress mode, for example. In both these modes, segments of data are being transferred from source volumes to destinations volumes identified for a consistency group. The segments which are to be transferred toward formation of the consistency group are identified by a first data structure, such as the OOS bitmap 66, for example. In this example, the OOS 66 has bits which may be set to indicate that particular segments are to be transferred to form a consistency group.

In one operation of mode B, which may be a Consistency Group In Progress mode, for example, a first data structure, such as the OOS 66, for example, is updated (block 200) to indicate successful transfer of a segment of data, such as a data track, for example, toward the creation of a consistency group. In this example, the OOS 66 has bits which may be reset or cleared to indicate that particular segments have been successfully transferred. A second data structure, such as the change recording bitmap 68, for example, is updated (block 202) to indicate additional segments of data to be transferred. These additional segments may be, for example, data segments which the host has subsequently written to one or more of the consistency group source volumes after the formation of the consistency group was initiated. In this example, the change recording bitmap 68 has bits which may be set to indicate subsequently written segments. As discussed below, in this example, data segments indicated by the change recording bitmap 68 will eventually be transferred to the destination volumes of the consistency group after the consistency group has been successfully formed or upon a failure of the consistency group to successfully form.

As the first data structure such as the OOS 66 is drained, a determination (block 203) is made as to whether the consistency group has been successfully created. If not, a determination (block 204) may be made as to whether a time limit has expired prior to creation of the consistency group. In the illustrated embodiment, the time limit of this determination may be a fixed time period which may be set by an administrator, for example. However, it is appreciated that in other embodiments this time period may be a dynamically calculated time period. If the time limit has not expired and the consistency group has not yet been created, the first data structure, such as the OOS 66, for example, continues to be updated (block 200) to indicate successful transfers of segments of data toward the creation of a consistency group. In addition, the second data structure, such as the change recording bitmap 68, continues to be updated (block 202) to indicate any subsequent segments of data to be eventually transferred.

If it is determined (block 204) that the time limit has expired prior to creation of the consistency group, a determination (block 206) is made as to whether this time limit has expired a predetermined number of times prior to creation of the consistency group. This predetermined number of times may be five times, for example. It is appreciated that other failure limits may be selected as well.

Thus, in this example, if it is determined (block 206) that the creation of the consistency group has failed less than five times, preparations to switch to Mode A are performed. During this preparation, at least one backlog of data segments remaining to be transferred may be determined (block 210). A data segment backlog may be determined on a server by server basis, a volume by volume basis or any other suitable unit of storage. In the illustrated embodiment, a data segment backlog is determined for each server having one or more source volumes of the consistency group. It is appreciated that a lesser number of data segment backlogs may be determined, depending upon the particular application.

In the illustrated embodiment, a data segment backlog may be determined by calculating at a particular time, the number of bits in the OOS 66 for a particular server, representing the number of data segments remaining to be transferred for that particular server at that particular time. This bit enumeration may be done for each additional source server. It is appreciated that a backlog may be determined using other techniques, depending upon the particular application.

In another operation, a transfer time for the first data structure may be selected (block 212) as a function of the at least one determined backlog. In selecting a transfer time, a data transfer rate may be determined on a server by server basis, a volume by volume basis or any other suitable unit of storage. In the illustrated embodiment, a data rate is determined for each server having one or more source volumes of the consistency group. It is appreciated that a lesser number of data rates may be determined, depending upon the particular application.

In the illustrated embodiment, a data transfer rate may be determined by calculating at a particular time, the number of bits in the OOS 66 for a particular server, representing the number of data segments remaining to be transferred for that particular server at that particular time. This bit enumeration may be done for each additional source server. A period of time later, the number of bits remaining in the OOS bitmap 66 may be calculated again for each source server. The elapse in time between the first bit enumeration for a source server and the second bit enumeration for that server represents a test period. This test period may be 1 second in duration, or in a range of 0.5 to 2 seconds, for example. It is appreciated that other durations may be selected as well, depending upon the particular application.

The change or difference in the number of bits remaining in the OOS 66 for a particular source server represents the number of data segments which have been transferred for that server during the test period. Accordingly, a data transfer rate for each source server may be calculated by dividing the change in the number of bits remaining in the OOS 66 for the server, by the duration of the associated test period. In this example, the backlog for each server, that is, the number of data segments remaining for each source server, may be divided by the data transfer rate determined for that server to provide an estimated time for the OOS 66 to drain down to a suitable level to reduce or eliminate any backlog for that server. Thus, the estimated transfer time for a particular server may be relatively large or relatively small, depending upon the backlog for that server and the data transfer rate for that server.

In the illustrated embodiment, the longest estimated transfer time of the estimated transfer times calculated for each source server may be selected as a transfer time. In another embodiment, the selected transfer time may be calculated by increasing the longest estimated transfer time by a certain factor to increase the likelihood that the backlog is reduced. For example, the longest estimated transfer time may be multiplied by a certain factor such as 2 or 3, for example, to provide the selected transfer time (block 212). As another example, a fixed or variable time period may be added to the longest estimated transfer time to provide a selected transfer time. It is appreciated that a number of procedures may be used to dynamically select a transfer time based upon one or more determined backlogs.

With the potential transfer time selected, operations switch to mode A and the second data structure, which in this example is a change recording bitmap 68, is merged (block 213) into the first data structure, that is, the OOS 66, in this example. Thus, all data segments including the segments written to the source volumes subsequent to the initiation of the consistency group formation, which are to be transferred for the volumes of the failed consistency group, may be indicated by bits of the OOS 66 in this mode.

As data segments as identified by the first data structure (the OOS 66 in this example) continue to be transferred, the first data structure may be updated (block 214) to indicate the successful transfer of a data segment. In this example, a bit of the out-of-synch bitmap 66 may be cleared to indicate each successful transfer. In mode A (a Normal Transfer mode in this example), the first data structure (the OOS 66 in this example) is also updated (216) to indicate any additional data segments subsequently written to the source volumes, which are to be transferred as well. In this example, a bit of the out-of-synch bitmap 66 may be set to indicate each subsequent data segment written by the host after the merger of the second data structure into the first data structure.

In another operation, a determination is made (block 218) as to whether the transfer time selected (block 212) has expired. If not, data segments as identified by the first data structure (the OOS 66 in this example) continue to be transferred, the first data structure continues to be updated (block 214) to indicate the successful transfer of each data segment and the first data structure continues to be updated (216) to indicate any subsequent data segments written to the source volumes, which are to be transferred as well.

As set forth above, the selected transfer time may be dynamically calculated based upon one or more determined backlogs, to increase the likelihood that the backlog is reduced to a suitable level by the time the selected transfer time expires. Hence, when the selected transfer time does expire (block 218), the mode of operation may be switched back to another mode, such as mode B (the Consistency Group in Progress mode in this example) which includes the operations of blocks 200-212. By selecting the transfer time in a manner which increases the likelihood that the backlog is reduced to a suitable level, the likelihood of successful creation of the consistency group prior to expiration of the mode B time limit (block 204) may be increased. Once it is determined (block 203) that a consistency group has successfully formed, operations may switch to mode A which is the Normal Transfer Mode, in this example.

Furthermore, long waits in the Mode B (Consistency Group in Progress mode in this example) when there is relatively little chance that a consistency group may be successfully created, may also be reduced. It is appreciated that in other applications, transfer times may be dynamically selected based upon one or more backlogs to achieve different or additional features, depending upon the particular application.

Figure 6:
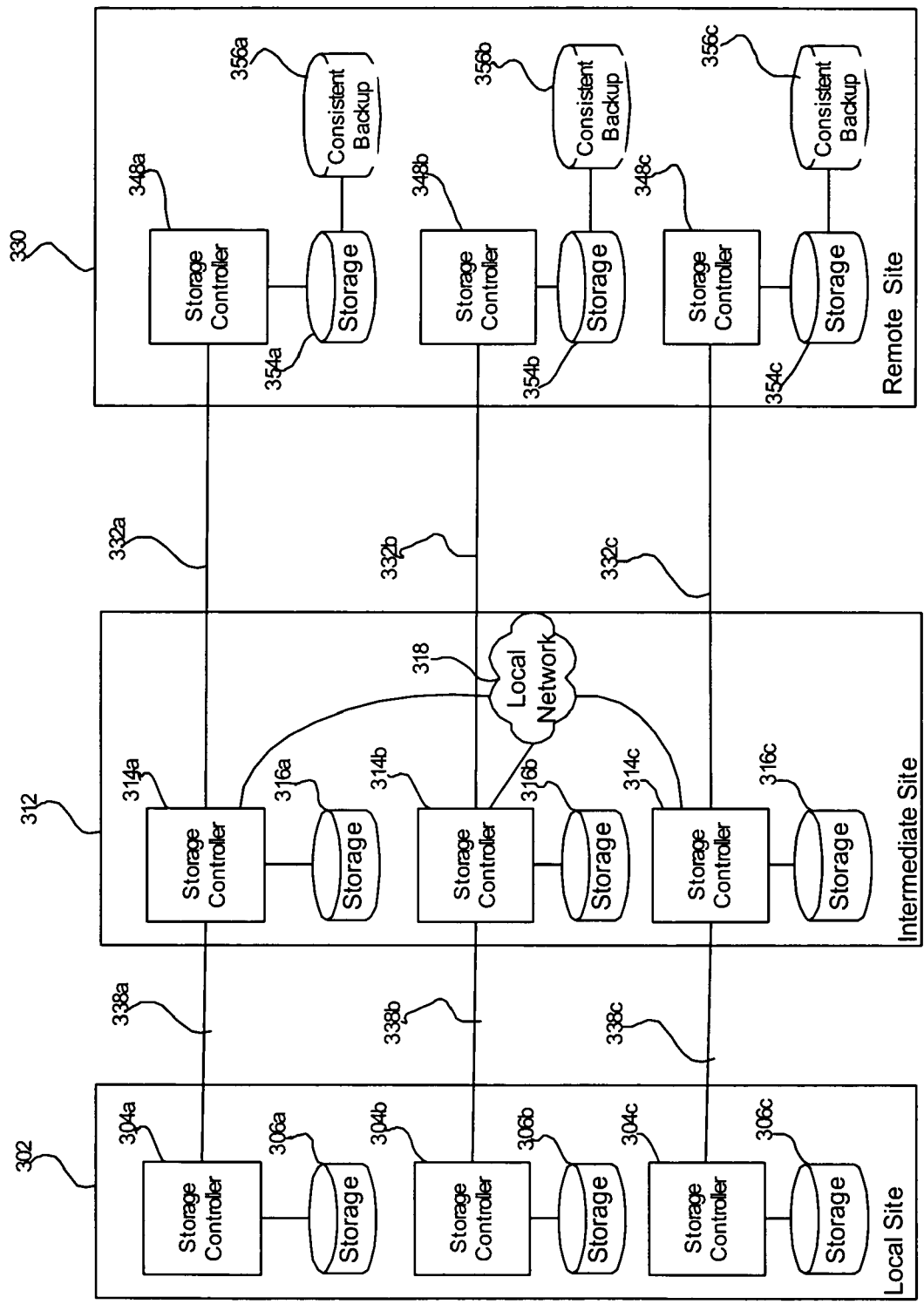
FIG. 6 illustrates an additional network computing environment in which aspects of the description provided herein may be employed.

FIG. 6 illustrates a four volume solution, where the storage controllers 314a, 314b, 314c at an intermediate site 312 may operate in the same manner as the storage controllers 4a, 4b, and 4c described with respect to FIG. 1 and the components at the remote site 330 may operate as described at the remote site 10 components described with respect to FIG. 1. The local site 302 and intermediate site 312 may be situated in a relatively close geographical area, such as a same building, different buildings in a same campus, a same city, etc. The connections 338a, 338b, 338c between the storage controllers at the local 302 and intermediate 312 sites may comprise separate dedicated lines or the connections may extend through a switched network, such as a Storage Area Network (SAN), Local Area Network (LAN), the Internet, an Intranet, etc. The remote site 330 may be hundreds or thousands of miles from the local 302 and intermediate 312 sites. The connections 332a, 332b, 332c may comprise the connections 12a, 12b, 12c described above with respect to FIG. 1, comprising long distance connections.

In the embodiment of FIG. 6, hosts would direct I/O requests to the storage controllers 304a, 304b, 304c managing storage systems 306a, 306b, 306c at the local site 302. The storage controllers 304a, 304b, 304c at the local site 302 would then synchronously copy any writes to the storage controllers 314a, 314b, 314c at the intermediate site 312. In certain embodiments, the host writes would not complete until the local storage controllers 304a, 304b, 304c synchronously copied the data to the intermediate site 312. The master storage controllers, e.g., 314c, would then asynchronously manage consistency group formation at the remote site 330 as described with respect to FIG. 5 according to remote copy policies embodied in the master storage controllers at the intermediate site 312.

The remote storage controllers 348a, 348b, 348c store the data to their respective attached remote storage systems 354a, 354b, 354c. In certain embodiments, the remote site 330 may save a consistency group of data to another storage, such as consistent backup storages 356a, 356b, 356c, to maintain a backup of the consistent data at the remote site 330.

Additional Embodiment Details

The described techniques to form consistency groups may be embodied as a method, apparatus, deployment or article of manufacture using standard programming and/or engineering techniques to produce software, firmware, hardware, or any combination thereof. The term "article of manufacture" as used herein refers to code or logic embodied in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are utilized may further be accessible through a transmission media or from a file server over a network. In such cases, the article of manufacture in which the code is embodied may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present description, and that the article of manufacture may comprise any information bearing medium known in the art.

The described embodiments were described with respect to the IBM Asynchronous PPRC computing environment. However, the described embodiments for maintaining consistency could be applied to maintain consistency in other computing and vendor environments and using other data copying protocols and programs than described herein.

In described embodiments, the master and storage controller processes were executed in a distributed computing environment. In alternative embodiments one or more of the subordinate processor operations may be executed in the same machine or platform in which the master storage controller processes are executed.

In certain embodiments, data in the storage devices is arranged in volumes. In alternative systems, the storage areas on which data is maintained may be grouped according to storage units other than volumes that are grouped in groupings other than sessions for the purpose of maintaining consistency.

In described embodiments, the storage units designated as the subordinates in the master-subordinate copy relationship comprised volumes. In alternative embodiments, other storage unit values may be assigned as a subordinate to a master, where such storage units may comprise tracks in a volume, blocks, logical subsystems, logical drives, or any other physical or logical storage unit designation known in the art.

The described operations for forming a consistency group may be used in a critical data environment where high availability is paramount. However, those skilled in the art will appreciate that the point-in-time copy operations described herein may apply to storage systems used for non-critical data where high availability is not absolutely necessary.

In the described embodiments, each storage controller copies data to a corresponding remote storage controller having an attached remote storage system. In alternative embodiments, multiple storage controllers at the local or intermediate site may copy data to one remote storage controller, where a single remote storage controller may receive point-in-time data from multiple local or intermediate storage controllers.

The illustrated logic of FIG. 5 shows certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Figure 7:
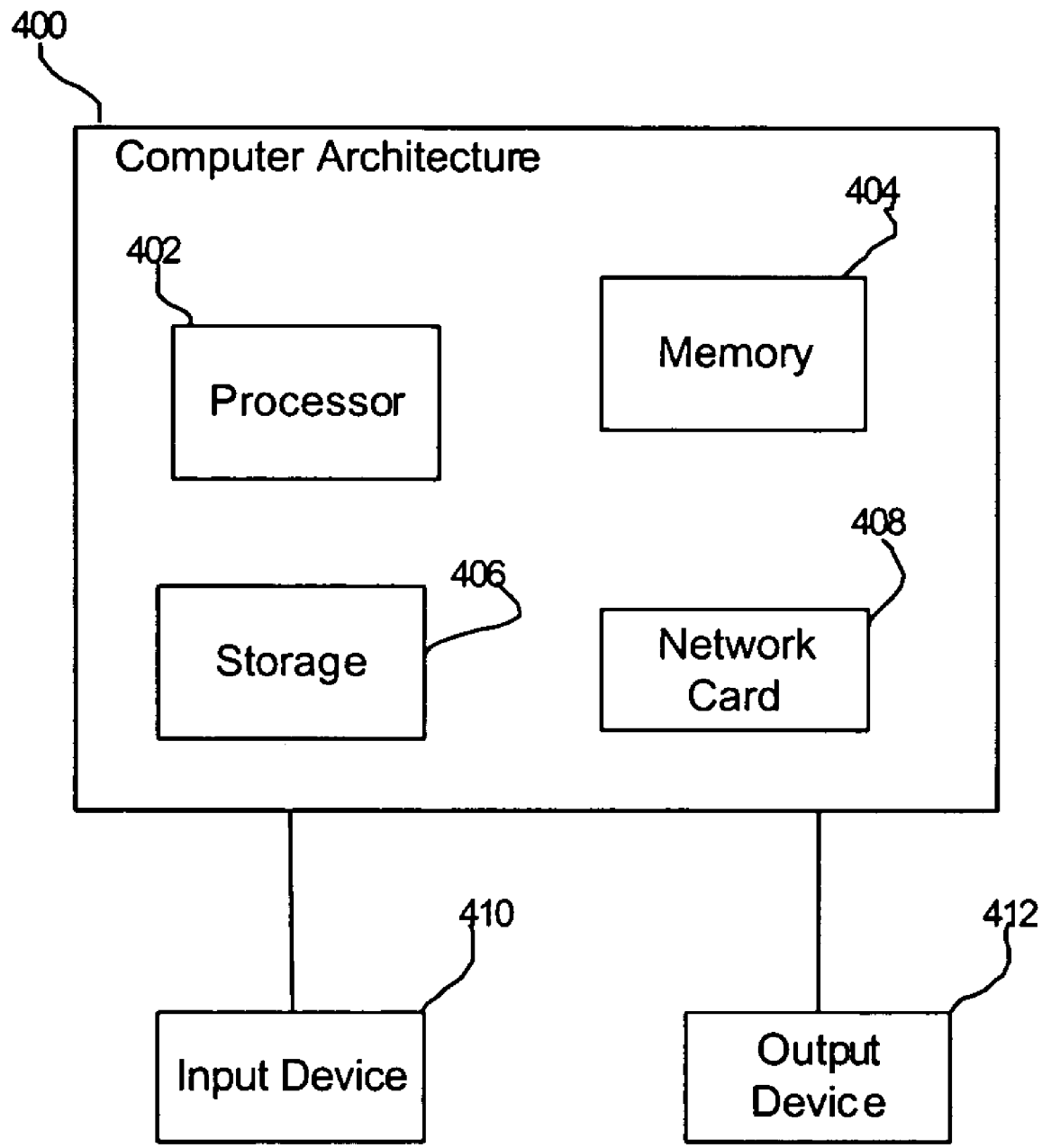
FIG. 7 illustrates an architecture of computing components, such as storage controllers, which may be employed in a network environment, in accordance with one embodiment.

FIG. 7 illustrates one embodiment of a computer architecture 400 of the network components, such as the storage controllers shown in FIGS. 1 and 6. The architecture 400 may include a processor 402 (e.g., a microprocessor), a memory 404 (e.g., a volatile memory device), and storage 406 (e.g., a non-volatile storage, such as magnetic disk drives, optical disk drives, a tape drive, etc.). The storage 406 may comprise an internal storage device or an attached or network accessible storage. Programs in the storage 406 are loaded into the memory 404 and executed by the processor 402 in a manner known in the art. The architecture further includes a network card 408 to enable communication with a network. An input device 410 is used to provide user input to the processor 402, and may include a keyboard, mouse, pen-stylus, microphone, touch sensitive display screen, or any other activation or input mechanism known in the art. An output device 412 is capable of rendering information transmitted from the processor 402, or other component, such as a display monitor, printer, storage, etc.

The foregoing description of various embodiments has been presented for the purposes of illustration and description. It is not intended to be exhaustive or to limit the description to the precise form disclosed. Many modifications and variations are possible in light of the above teaching.

What is claimed is:

1. A method of creating a consistency group, comprising:
    transferring segments of data identified in a first data structure, from a source of a plurality of sources to a destination of a plurality of destinations;

updating, by using a computer, said first data structure to indicate a transfer of a segment of data;

determining for each source at least one backlog of data segments remaining to be transferred from associated source to at least one destination;

determining an estimated transfer time for each source for said first data structure as a function of the backlog associated with each source;

selecting a transfer time for said first data structure as a function of said determined estimated transfer time of greatest duration;

in a first mode, updating said first data structure to indicate additional segments of data to be transferred between the sources and destinations; and upon expiration of said selected transfer time, switching from said first mode to a second mode in which consistency groups are created wherein said second mode includes updating a second data structure instead of said first data structure to indicate additional segments of data to be transferred between the sources and destinations of a consistency group;

upon expiration of a second time limit prior to creation of said consistency group, merging said second data structure into said first data structure and resuming said first mode, updating said first data structure instead of said second data structure to indicate additional segments of data to be transferred between sources and destinations of said consistency group;

upon expiration of a selected transfer time a second time, resuming said second mode, updating said second data structure instead of said first data structure to indicate additional segments of data to be transferred between the sources and destinations of said consistency group.

2. The method of claim 1 further comprising:

upon expiration of said second time limit a second time prior to creation of said consistency group, merging said second data structure into said first data structure and resuming said first mode, updating said first data structure instead of said second data structure to indicate additional segments of data to be transferred between sources and destinations of said consistency group.

3. The method of claim 2 further comprising:

upon expiration of said second time limit a predetermined number of times prior to creation of said consistency group, continuing said second mode instead of resuming said first mode, updating said second data structure instead of said first data structure to indicate additional segments of data to be transferred between sources and destinations of said consistency group.

4. The method of claim 3 wherein said first data structure is a bit map wherein each bit represents a track to be transferred from a source volume to a destination volume toward creating said consistency group in said second mode, and wherein said updating said first data structure to indicate a transfer of a segment of data toward creation of said consistency group, includes clearing a bit representing the track which was transferred toward the creation of said consistency group.

5. The method of claim 4 wherein said second data structure is a bit map wherein each bit represents a track to be transferred from a source volume to a destination volume of said consistency group and wherein said updating said second data structure to indicate additional segments of data to be transferred between the sources and destinations of said consistency group includes setting a bit to indicate a track to be transferred from a source volume to a destination volume of said consistency group.

6. The method of claim 5 wherein said updating said first data structure to indicate additional segments of data to be transferred between the sources and destinations of said consistency group includes setting a bit to indicate a track to be transferred from a source volume to a destination volume of said consistency group.

7. The method of claim 6 wherein the sources of the consistency group being created are volumes maintained by a plurality of servers and wherein said backlog determining includes determining at least one backlog for each server for data segments remaining to be transferred from the associated server.

8. The method of claim 7 wherein said transfer time selecting includes determining at least one data transfer rate for each server for data transferred from the associated server, and determining an estimated transfer time for each server for said first data structure as a function of said backlog and said transfer rate determined for the associated server and selecting the determined transfer time of greatest duration.

9. The method of claim 8 wherein said determining at least one data transfer rate for each server includes determining at a first time, the number of tracks remaining to be transferred for a particular server toward creation of said consistency group as indicated by said first data structure, determining at a second, subsequent time, the number of tracks remaining to be transferred for the particular server toward creation of said consistency group as indicated by said first data structure, determining the rate of change of the number of tracks remaining to be transferred for the particular server as a function of the change in the number of tracks determined at said first and second times and dividing by the duration of time between said first and second times.

10. The method of claim 9 wherein said determining an estimated transfer time for each server includes dividing the backlog of the number of tracks remaining to be transferred for the particular server toward creation of said consistency group as indicated by said first data structure, by the data transfer rate determined for the particular server.

11. A method for deploying computing instructions, comprising integrating computer-readable code into a system, wherein the system has a memory adapted to maintain first and second data structures and wherein the system is in communication with at least one storage controller which manages at least one storage unit comprising a plurality of sources, and wherein each storage controller is in communication with one remote storage which comprises a plurality of destinations, wherein the code in combination with system is enabled to cause the system to perform:

transferring segments of data identified in said first data structure, from a source of said plurality of sources to a destination of said plurality of destinations;

updating said first data structure to indicate a transfer of a segment of data;

determining for each source at least one backlog of data segments remaining to be transferred from associated source to at least one destination;

determining an estimated transfer time for each source for said first data structure as a function of the backlog associated with each source;

selecting a transfer time for said first data structure as a function of said determined estimated transfer time of greatest duration;

in a first mode, updating said first data structure to indicate additional segments of data to be transferred between the sources and destinations;

upon expiration of said selected transfer time, switching from said first mode to a second mode in which consistency groups are created;

in said second mode, updating said second data structure instead of said first data structure to indicate additional segments of data to be transferred between the sources and destinations of a consistency group;

upon expiration of a second time limit prior to creation of said consistency group, merging said second data structure into said first data structure and switching from said second mode to said first mode wherein said first data structure is undated instead of said second data structure to indicate additional segments of data to be transferred between sources and destinations of a consistency group; and upon expiration of a selected transfer time a second time, switching from said first mode to said second mode wherein said second data structure is updated instead of said first data structure to indicate additional segments of data to be transferred between the sources and destinations of a consistency group.

12. The method of claim 11 wherein at least one storage unit is a Redundant Array of Independent Disks (RAID) array storage unit.

13. The method of claim 11 wherein the code is further enabled to cause the system to perform:

upon expiration of said second time limit a second time prior to creation of said consistency group, merging said second data structure into said first data structure and resuming said first mode, updating said first data structure instead of said second data structure to indicate additional segments of data to be transferred between sources and destinations of said consistency group.

14. The method of claim 13 wherein the code is further enabled to cause the system to perform:

upon expiration of said second time limit a predetermined number of times prior to creation of said consistency group, continuing said second mode instead of resuming said first mode, updating said second data structure instead of said first data structure to indicate additional segments of data to be transferred between sources and destinations of said consistency group.

15. The method of claim 14 wherein said first data structure is a bit map wherein each bit represents a track to be transferred from a source volume to a destination volume toward creating said consistency group in said second mode, and wherein said updating said first data structure to indicate a transfer of a segment of data toward creation of said consistency group, includes clearing a bit representing the track which was transferred toward the creation of said consistency group.

16. The method of claim 15 wherein said second data structure is a bit map wherein each bit represents a track to be transferred from a source volume to a destination volume of said consistency group and wherein said updating said second data structure to indicate additional segments of data to be transferred between the sources and destinations of said consistency group includes setting a bit to indicate a track to be transferred from a source volume to a destination volume of said consistency group.

17. The method of claim 16 wherein said updating said first data structure to indicate additional segments of data to be transferred between the sources and destinations of said consistency group includes setting a bit to indicate a track to be transferred from a source volume to a destination volume of said consistency group.

18. The method of claim 17 wherein the sources of the consistency group being created are volumes maintained by a plurality of servers and wherein said backlog determining includes determining at least one backlog for each sewer for data segments remaining to be transferred from the associated server.

19. The method of claim 18 wherein said transfer time selecting includes determining at least one data transfer rate for each server for data transferred from the associated server, and determining an estimated transfer time for each server for said first data structure as a function of said backlog and said transfer rate determined for the associated server and selecting the determined transfer time of greatest duration.

20. The method of claim 19 wherein said determining at least one data transfer rate for each server includes determining at a first time, the number of tracks remaining to be transferred for a particular server toward creation of said consistency group as indicated by said first data structure, determining at a second, subsequent time, the number of tracks remaining to be transferred for the particular server toward creation of said consistency group as indicated by said first data structure, determining the rate of change of the number of tracks remaining to be transferred for the particular sewer as a function of the change in the number of tracks determined at said first and second times and dividing by the duration of time between said first and second times.

21. The method of claim 20 wherein said determining an estimated transfer time for each server includes dividing the backlog of the number of tracks remaining to be transferred for the particular server toward creation of said consistency group as indicated by said first data structure, by the data transfer rate determined for the particular server.

* * * * *

UNITED STATES PATENT AND TRADEMARK OFFICE
CERTIFICATE OF CORRECTION

PATENT NO. : 7,647,357 B2
APPLICATION NO. : 10/987570
DATED : January 12, 2010
INVENTOR(S) : Bartfai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 704 days.

Signed and Sealed this

Sixteenth Day of November, 2010

David J. Kappos
*Director of the United States Patent and Trademark Office*